UNITED STATES PATENT OFFICE.

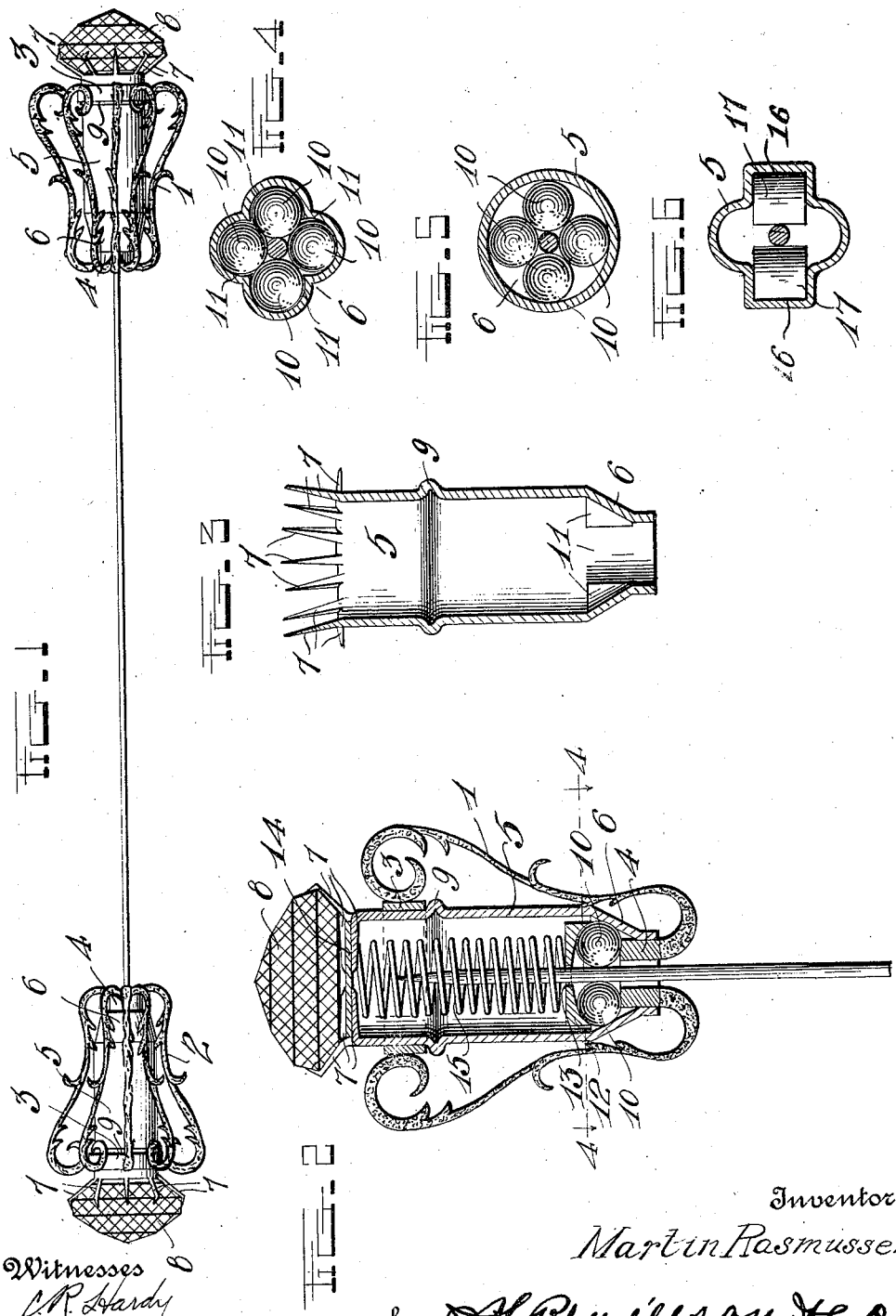

MARTIN RASMUSSEN, OF RACINE, WISCONSIN.

HAT-PIN FASTENER AND GUARD.

1,014,176.  Specification of Letters Patent.  Patented Jan. 9, 1912.

Application filed December 29, 1910. Serial No. 599,809.

*To all whom it may concern:*

Be it known that I, MARTIN RASMUSSEN, a citizen of Denmark, residing at Racine, in the county of Racine and State of Wisconsin, have invented certain new and useful Improvements in Hat-Pin Fasteners and Guards; and I do declare the following to be a full, clear, and exact description of the invention, such as will enable others skilled in the art to which it appertains to make and use the same.

This invention relates to improvements in hat pin guards and fasteners.

One object of the invention is to provide an improved construction of hat pin guard and fastener having an improved means for attaching the same to the pointed end of a hat pin whereby said end will be prevented from catching into other objects or injuring other people and whereby the pin will be secured against casual removal and lost from the hat.

Another object is to provide a hat pin fastener and guard which will be ornamental and attractive in appearance and which may correspond to the ornamental head of the pin.

With the foregoing and other objects in view, the invention consists of certain novel features of construction, combination and arrangement of parts as will be more fully described and particularly pointed out in the appended claim.

In the accompanying drawings: Figure 1 is a side view of a hat pin showing my improved fastener and guard applied thereto; Fig. 2 is a central longitudinal section of the fastener and guard and the point end of the pin; Fig. 3 is a similar view of the tubular inner member of the device; Fig. 4 is a cross sectional view on the line 4—4 of Fig. 2; Fig. 5 is a similar view showing a modified construction of the inner end of the inner member or clutch tube of the fastener; Fig. 6 is a similar view showing another form of the inner end of the clutch tube and a different form of clutch devices.

In the embodiment of the invention I provide an outer frame 1 which may be of any suitable shape and formed in any suitable ornamental design, said design preferably corresponding with the design of the head 2 of the pin. In the upper end of the frame 1 is arranged a ring or annular band 3, while in the lower end of the frame is secured a short inwardly extending guard releasing tube 4.

Arranged in the frame 1 is a clutch tube or casing 5 having a tapered inner end 6 and having its outer end cut or slitted inwardly to form a series of jewel holding fingers 7 which are adapted to form a crown setting for a jewel or ornamental head 8. In the tube near its outer end is formed an annular bead 9 which engages the inner edge of the ring or band 3 of the frame and holds the tube in position in the latter.

Arranged in the inner end of the tube 5 is a pin gripping clutch comprising a series of balls or spherical bodies 10 which engage or rest on the inner end of the tube 4 of the frame and are adapted to be forced inwardly into engagement with the point of the pin when projected through said tube by the tapered inner end of the tube or casing 5. The inner tapered ball engaging end 6 of the tube 5 may be constructed to form a series of ball receiving grooves or channels 11 or said tapered end may be circular as shown in Fig. 5 of the drawing or of the shape shown in Fig. 6. The balls 10 are held down in operative engagement with the inner end of the tube 4 by a washer or ball holding plate 12 which may be concaved or provided with a concaved inner surface as shown. In the washer or plate 12 is formed a transversely disposed passage 13 through which the point of the pin passes when engaged with the guard.

In the outer end of the tube 5 is arranged a closing plate 14 which is held in position by some of the fingers 7 on the outer end of the tube, said fingers being bent inwardly in an opposite direction to the fingers which form the crown setting for the jewel on the outer end of the guard. Between the plate 14 and the washer 12 is arranged a coiled spring 15 the pressure of which is exerted to draw the tube 5 outwardly and the tapered inner end of the same into engagement with the gripping balls 10 whereby the latter are forced inwardly into tight engagement with the projecting end of the pin thereby securely holding the guard in position on the point of the pin thereby preventing the casual withdrawing of the pin from the hat and also preventing the sharp point of the pin from catching into any other objects. When it is desired to remove the guard it is simply necessary to press inwardly thereon which action will disengage the tapered inner end of the tubes from the balls 10 thereby permitting the latter to disengage and release the pin whereupon the latter may be drawn out of the guard.

In Fig. 6 of the drawings the clutch tube 5 is shown as having its tapered inner end provided with oppositely disposed substantially rectangular channels 16 in which are operatively mounted cylindrical clutch rollers 17 which are adapted to be forced into engagement with and released from the point of the pin by the movement of the clutch tube as hereinbefore described.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as defined in the appended claim.

Having thus described my invention, what I claim is:

A hat pin fastener and guard comprising a clutch tube having one end closed, provided with a tapered portion and a reduced cylindrical end, a frame slidably mounted on the tube at one end and provided at its opposite end with an annular band slidably mounted in the reduced end of the tube, balls in the tapered portion of the clutch tube, a washer within the tube and bearing on the inner sides of the balls, and an expansive spring in the tube between its closed end and the washer, the balls being arranged to permit of the introduction of the point of the pin between them the annular band being adapted to contact with the balls to move them from clutching position.

In testimony whereof I have hereunto set my hand in presence of two subscribing witnesses.

MARTIN RASMUSSEN.

Witnesses:
 GUY A. BENSON,
 A. R. JANECKY.